US007874462B2

(12) United States Patent
Yandell

(10) Patent No.: US 7,874,462 B2
(45) Date of Patent: Jan. 25, 2011

(54) PRESSURE-ACTUATED LIQUID DISINFECTANT DISPENSER AND METHOD FOR AN AEROBIC TREATMENT SYSTEM

(75) Inventor: Cecil A. Yandell, Goliad, TX (US)

(73) Assignee: Cecil's On-Site Products, Inc., Goliad, TX (US)

( * ) Notice: Subject to any disclaimer, the term of this patent is extended or adjusted under 35 U.S.C. 154(b) by 1022 days.

(21) Appl. No.: 11/672,936

(22) Filed: Feb. 8, 2007

(65) Prior Publication Data

US 2008/0189841 A1    Aug. 14, 2008

(51) Int. Cl.
*C02F 1/50*    (2006.01)
(52) U.S. Cl. .................. 222/190; 222/129; 222/394; 222/638; 210/170.08; 210/209; 210/631; 210/749
(58) Field of Classification Search ............. 222/129, 222/190, 394; 4/222, 227.1, 227.4–227.6; 210/170.08, 209, 631, 749
See application file for complete search history.

(56) References Cited

U.S. PATENT DOCUMENTS

| 5,370,274 | A | * | 12/1994 | Ohmi et al. ............. 222/135 |
| 6,627,071 | B1 | | 9/2003 | Braden |
| 6,932,912 | B2 | | 8/2005 | Chaffin |
| 2008/0035539 | A1 | | 2/2008 | Chaffin |

* cited by examiner

*Primary Examiner*—J. Casimer Jacyna

(57) ABSTRACT

A pressure-actuated disinfectant dispenser and method for treating wastewater in an aerobic treatment system. The dispenser includes a reservoir for holding a disinfectant supply and a dosage container for holding a dosage of disinfectant. The container is positioned within the reservoir and has a flow-regulated path for fluid communication from the reservoir into the container. The invention also includes actuation means for increasing the pressure within the dosage container to force disinfectant therefrom, and a discharge assembly for discharging fluid from the dosage container into said storage tank.

12 Claims, 5 Drawing Sheets

PRESSURE-ACTUATED LIQUID DISINFECTANT DISPENSER AND METHOD FOR AN AEROBIC TREATMENT SYSTEM

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to an apparatus for use with aerobic treatment systems. More specifically, the invention relates to a liquid disinfectant dispenser for treating sewage wastewater prior to discharging effluent into the environment.

2. Description of the Related Art

Aerobic treatment systems treat wastewater using natural processes that require oxygen. Bacteria work to break down and digest the wastewater inside the aerobic treatment unit. Because these bacteria flourish in high-oxygen environments, aerobic treatment systems require air to be injected into the system to facilitate the breakdown of wastewater. Even after breakdown, however, the treated wastewater leaving the unit requires additional treatment or disinfection before being returned to the environment.

Most aerobic treatment systems include a main compartment called an aeration chamber in which injected air is mixed with wastewater. Because most home aerobic units are buried underground, the air is forced into the aeration chamber by an air compressor or mixed by liquid agitation. The forced air mixes with wastewater in the aeration chamber, and the oxygen supports the growth of aerobic bacteria that digests the solids in the wastewater.

Because the bacteria cannot digest all of the solids, the undigested solids eventually settle out as sludge. Many aerobic units include a secondary chamber called a settling chamber or holding chamber where excess solids can settle. Other designs allow the sludge to accumulate at the bottom of the tank. In aerobic units designed with a separate settling compartment, the sludge returns to the aeration chamber (either by gravity or by a pumping device). The sludge contains bacteria that also aid in the treatment process.

As the sewage separates into liquid and solid components, the liquid is collected into the separate holding chamber where it can be pumped back to the surface or into a leach field. Prior to discharge, however, the liquid must treated with chlorine or similar disinfector to produce an antiseptic output. Only after disinfecting can the liquid be safely discharged into the environment.

Until recently, the typical method of treating the wastewater within an aerobic system was to cause the wastewater to come into contact with chlorine tablets, but chlorine in tablet form has traditionally been more difficult and expensive to acquire in solid form vis-à-vis chlorine in liquid form, such as common household bleach. Accordingly, regulation of such systems has been relaxed to allow the increased use of liquid chlorine in aerobic treatment systems. Liquid chlorine has lower cost than chlorine in tablet form and is more readily available.

Several patents have addressed the use of liquid chlorine in such systems. U.S. Pat. No. 6,932,912 (the '912 patent), for example, provides a wastewater treatment system for residential septic systems wherein liquid chlorine is drawn into the storage tank to treat sewage effluent. A liquid chlorine supply canister is connected by a supply tube and venturi chamber to a recirculating pipe that discharges the liquid chlorine into a storage-mixing tank. As the effluent is discharged, some of the effluent is recirculated back into the storage-mixing tank to facilitate efficient mixing of the chlorine.

Similarly, U.S. Pat. No. 6,627,071 (the '071 patent) provides a chlorinator for these systems that is designed to discharge a uniform volume of disinfectant. A check valve separates a container from the disinfectant supply, and the check valve limits flow into the container during operation of the effluent pump. After the pumping cycle, the check valve opens to allow the container to refill with disinfectant.

BRIEF SUMMARY OF THE INVENTION

The present invention includes a pressure-actuated liquid disinfectant dispenser for treating wastewater in an aerobic treatment system. The dispenser comprises a reservoir for holding a disinfectant supply and a dosage container for holding a dosage of disinfectant. A flow-regulated path for fluid communication from the reservoir is disposed therethrough. The container is positioned within the reservoir. The invention also includes actuation means for increasing the pressure within the dosage container, and a discharge assembly for discharging fluid from the dosage container into the storage tank.

According to one aspect of the invention, the actuation means includes a timer-controlled valve that opens to communicate air from an air compressor into the dosage container. The increased pressure within the dosage container forces disinfectant contained therein through a discharge assembly and into the storage tank. According to another aspect of the invention, the actuation means includes a bladder that expands to fill an interior of the dosage container, thus forcing disinfectant contained therein from the container and into a storage tank.

Another aspect of the invention includes a method of dispensing a disinfectant into an aerobic treatment system having a storage tank. The method comprises regulating a flow of disinfectant through a fluid communication path from a reservoir adapted to hold a supply of disinfectant to the interior of a dosage container; increasing the pressure within the dosage container to force disinfectant into a discharge assembly connected to the dosage container and having a discharge end with the storage tank; and discharging disinfectant from the discharge end into the storage tank.

BRIEF DESCRIPTION OF THE SEVERAL VIEWS OF THE DRAWING

The present invention, as well as further objects and features thereof, are more clearly and fully set forth in the following description of the preferred embodiment, which should be read with reference to the accompanying drawings, wherein.

DETAILED DESCRIPTION OF THE INVENTION

Figure 1:
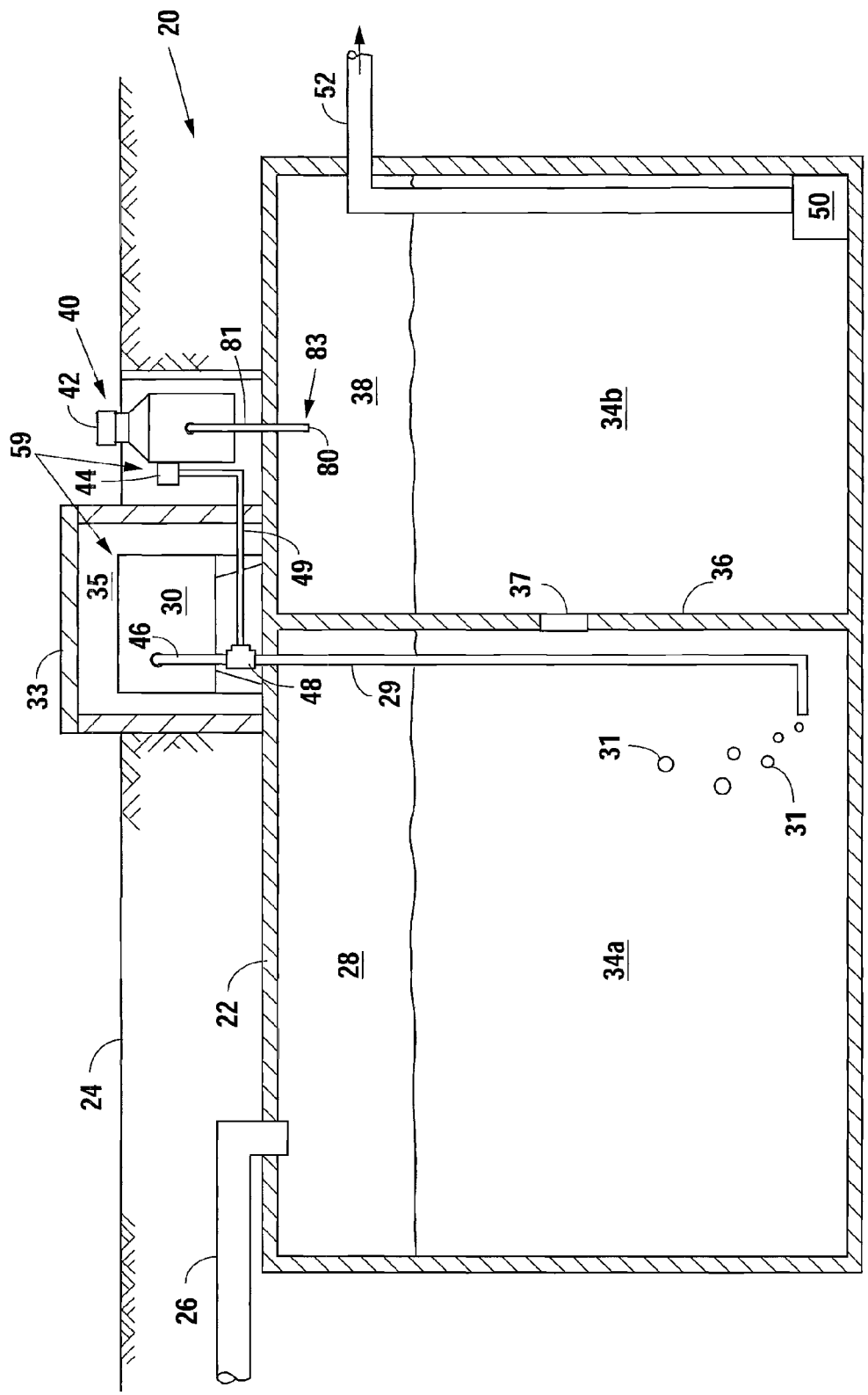
FIG. 1 illustrates a partial sectional view of an aerobic treatment system incorporating the preferred embodiment of the present invention.

FIG. 1 discloses an aerobic treatment system 20 comprising a storage tank 22 buried under a ground surface 24. During operation, sewage flows from an on-site facility, such as a residence, through a sewage pipe 26 into the storage tank 22 and, more specifically, into an aeration chamber 28. Because aerobic bacteria present in the tank 22 require oxygen to break down the sewage into simple compounds, an air compressor 30, which is contained within a compressor chamber 35 and accessible by removing a cover 33, continuously forces air 31 into the aeration chamber 28 through an aeration hose 29. The sewage breakdown from this aerobic process produces primarily liquid wastewater 34a, 34b that flows from the aeration chamber 28 through an opening 37 in a baffle 36 and into a holding chamber 38. After proper dosing with disinfectant, a pump 50 moves the effluent through a discharge pipe 52 and into the surrounding environment.

A liquid disinfectant dispenser 40 of the present invention is preferably positioned in the earth near the storage tank 22 and is accessible from the surface 24. The dispenser 40 is preferably positioned near the treatment system 20 so that maintenance of the system 20 and the dispenser 40 can be near contemporaneous. The dispenser 40 may be filled with disinfectant by removing a threaded cap 42 and pouring a liquid disinfectant, such as household bleach, into the dispenser 40. Actuation means 59 for forcing disinfectant from the dispenser 40 include the air compressor 30 and a timer-controlled, normally-closed valve 44, which is connected to a compressor hose 46 from the air compressor 30 through a tee junction 48 and blower hose 49 extending between the junction 48 and the valve 44.

The valve 44 is programmed to open at a predetermined time and for a predetermined duration. Because the air compressor 30 is continuously operating to inject air 31 into the aeration chamber 28, when the valve 44 opens, air is communicated from the tee junction 48 into the dispenser 40 by way of the blower hose 49. During a dosage cycle, the increased pressure resulting from the communicated air forces disinfectant from the dispenser 40 and discharged into the wastewater 34b contained within the holding chamber 38 through a discharge end 80 of a dispenser line 81, as will be described hereinafter. In an alternative embodiment of the invention, the pump 50 and dispenser 40 may further be in communication so that the pump 50 is actuated simultaneously with the opening of the valve 44.

Figure 2:
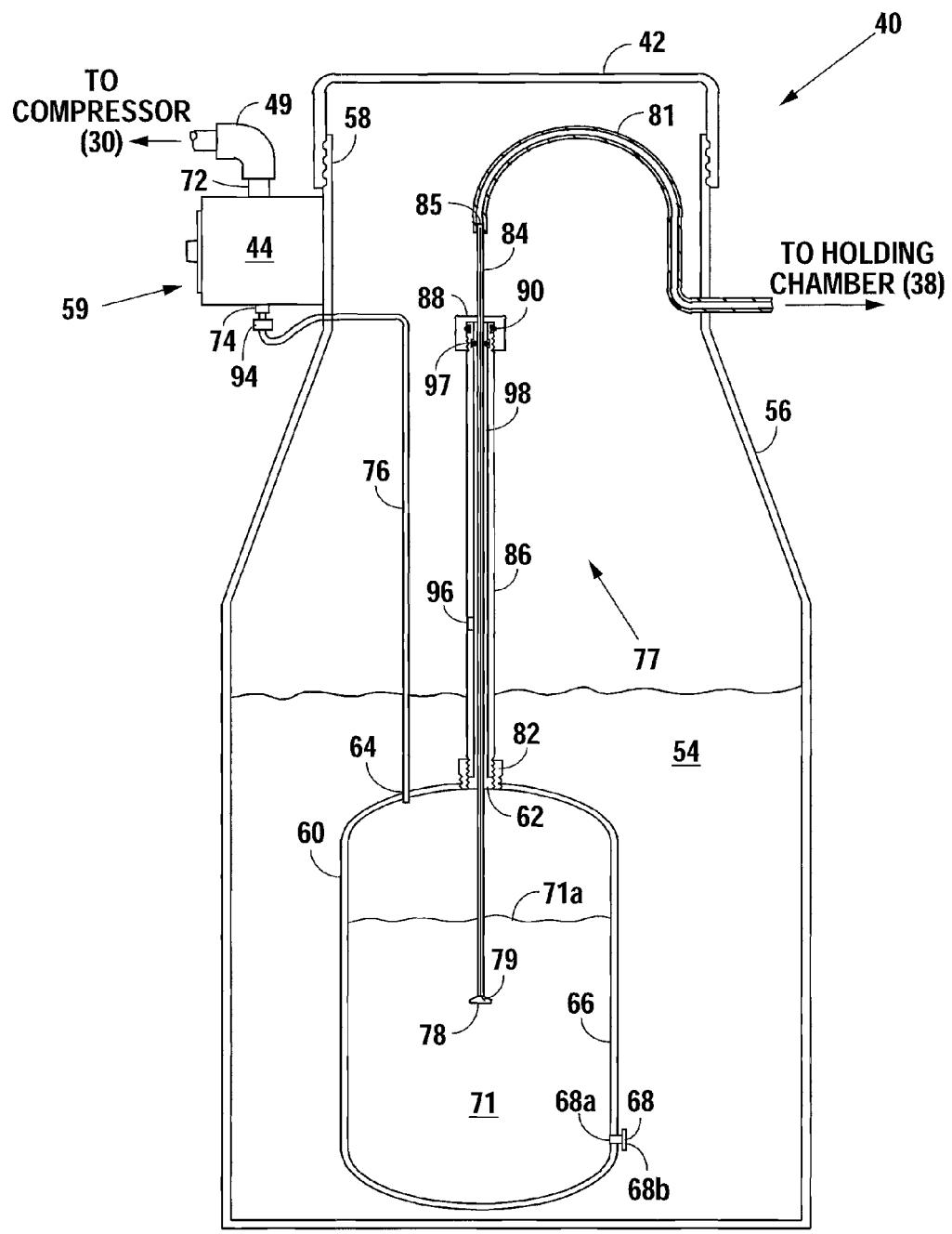
FIG. 2 shows a partial sectional view of the preferred embodiment of the present invention.

FIG. 2 is a partial sectional view of the preferred embodiment of the invention, and more clearly illustrates operation of the dispenser 40. A supply 54 of liquid disinfectant is contained by a reservoir 56 that is preferably PVC. The top end 58 of the reservoir 56 has outer threads. The cap 42, which is also preferably PVC, has inner threads matable to the outer threads of the top end 58 so that the reservoir 56 may be closed off from the environment and disinfectant held therein. The interior of the reservoir 56 may be accessed to add or remove disinfectant by removing the threaded cap 42.

A dosage container 60 is submerged within the interior of the reservoir 56. The container 60, which is preferably PVC, is a closed cylindrical bulb, and has a first opening 62 having inner threads, a second opening 64, and a sidewall 66. An emitter 68 having two openings 68a, 68b provides fluid communication between the reservoir 56 and the interior of the container 60 extends through the sidewall 66 of the container 60. The emitter 68 is mounted in the sidewall 66 of the container 60 so that fluid from the supply 54 can flow to the interior of the container 60 only through the emitter 68. Generally, emitters regulate liquid flow by restricting the flow rate of fluids. Typical emitter flow rates range from 0.16 gallons to four gallons per hour, and will vary according to the pressure differential between the two openings 68a, 68b of the emitter 68. Although the preferred embodiment of the present invention discloses the use of an emitter, other flow regulators may be used.

An inlet 72 of the valve 44 is connected to the air compressor 30 (see FIG. 1) through the blower line 49 such that, when the compressor 30 is operating, air is communicated to the inlet 72. Because the valve 44 is only opened at predetermined intervals and for a predetermined duration, air from the blower line 49 is communicated through the valve 44 to an outlet 74 only for the predetermined duration. For example, the valve 44 may be programmable to open every eight hours for five minutes, or once a day for ten minutes, or at any interval in combination with any duration. When the valve 44 is opened, air is communicated from the blower line 49 through the outlet 74 into an attached air supply line 76. A check valve 94 is interposed between the air supply line 76 and outlet 74 to prevent disinfectant from flowing up the supply line 76 and through the valve 44.

A discharge assembly 77 having an intake end 78 and a discharge end 83 (see FIG. 1) is threadedly mated to the dosage container 60 at the first opening 62 to provide a path for fluid flow therefrom. The intake end 78 of the assembly 77 is positioned within the dosage container 60. The discharge end 83 of the tube assembly 77 is positioned within the holding chamber 38 (see FIG. 1) so that liquid disinfectant is dispensed into the wastewater 34b (see FIG. 1).

According to the preferred embodiment, the discharge assembly 77 comprises a threaded male adapter 82 having external threads matable to the first opening 62 of the dosage container 60. A dispenser tube 84 having an intake opening 79 and a discharge opening 85 is partially contained within a PVC housing 86 secured to the male adapter 82. A lower o-ring 97 seals the annulus 98 between the dispenser tube 84 and the housing 86. A vent hole 96 is disposed through the side of the housing 86 to allow pressure equalization between the reservoir 56 and container 60 after the dosage cycle.

The position of the intake opening 79 within the container 60 may vary using an adjustment nut 88 threadedly connected to the housing 86. When the adjustment nut 88 is turned in a direction, an upper o-ring 90 is compressed around the dispenser tube 84 to increase the friction therebetween, resulting in inhibited movement of the dispenser tube 84 relative to the housing 86. When the adjustment nut 88 is turned in another direction, the upper o-ring 90 is uncompressed and friction between the upper o-ring 90 and the dispenser tube 84 decreased, thus allowing the dispenser tube 84 to be more-easily moved relative to the housing 86. Thus, the position of the intake opening 79 of the dispenser tube 84 within the container 60 is adjustable. In the preferred embodiment, the dispenser tube 84 is vinyl, although any other suitable material may be used.

A dispenser line 81 is connected to the discharge opening 85 of the tube 84, providing a flow path for disinfectant between the dispenser tube 84 and the holding chamber 38 (see FIG. 1). The dispenser line 81 is flexible so that the position of the line 81 within the reservoir 56 adjusts as the dispenser tube 84 is repositioned relative to the housing 86.

To begin a dosage cycle, the valve 44 is opened at a predetermined time. Air is then forced through the valve 44 and into the dispensing container 60 through the check valve 94 and air supply line 76. Although during a dosage cycle air can escape the container 60 through the first opening 62, into the annulus 98, and out the vent hole 96, the vent hole 96 is small enough that the pressure within the dosage container 60 increases as air is communicated therein—that is, more air is entering the container 60 through the air supply line 76 than is leaving the container 60 through the first opening 62 and vent hole 96. This results in an overall pressure increase within the container 60 during a dosage cycle that forces disinfectant from the dosage container 60 into the intake opening 79 until the level 71a of dosage 71 in the container 60 falls below the intake end 78 of the discharge assembly 77. Thus, for a high dosage of disinfectant, the intake end 78 should be positioned further into the container 60; for a lower dosage of disinfectant, the intake end 78 should be positioned nearer the first opening 62, causing the level of disinfectant to more quickly drop below the intake end 78.

The emitter 68 ensures that the dosage container 60 will fill slower than it will empty during a dosage cycle, such that, at most, only the dosage 71 of disinfectant contained in the container 60 above the intake end 78 of the discharge assembly 77 at the start of the dosage cycle will be used. Because of the increased pressure within the container 60 during a dosage cycle, disinfectant will flow from the container 60 into the reservoir 56 through the emitter 68. In other words, the emitter 68 only restricts the flow rate therethrough, rather than restrict flow only to one direction as would a check valve.

At the end of the dosage cycle, the valve 44 closes, which causes the pressure within the container 60 to equalize with the pressure in the reservoir 56 through the vent hole 96 in the housing 86. The submerged container 60 will then refill as disinfectant flows from the reservoir 56 through the emitter 68 into the container 60. Disinfectant will flow from the reservoir 56 into the dosage container 60 until the pressure on both sides of the emitter 68 is equal, which varies in part on the volume of supply 54 contained by the reservoir 56: the higher the level of the supply 54 of disinfectant contained within the reservoir 56, the more disinfectant will flow through the emitter 68 into the container 60 because pressure at the reservoir side 68b of the emitter 68 will be greater than the pressure at the container side 68a.

This embodiment of the dispenser 40 requires preselection of the interval and duration for which the valve 44 will open. The reservoir 56 must be filled with an amount of liquid disinfectant, which can be household chlorine or bleach. As the liquid disinfectant is added to the supply 54, it surrounds the container 60 and the emitter 68 is submerged by the supply 54 of disinfectant. The disinfectant passes through the emitter 68 at a rate determined by the emitter characteristics and the pressure differential between the sides of the emitter 68, although in some cases a pressure-compensating emitter may be used, the flow rate through which is substantially constant regardless of the pressure differential. According to this embodiment, disinfectant will accumulate in the container 60 until the pressure differential between both sides 68a, 68b of the emitter 68 is zero.

Figure 3:
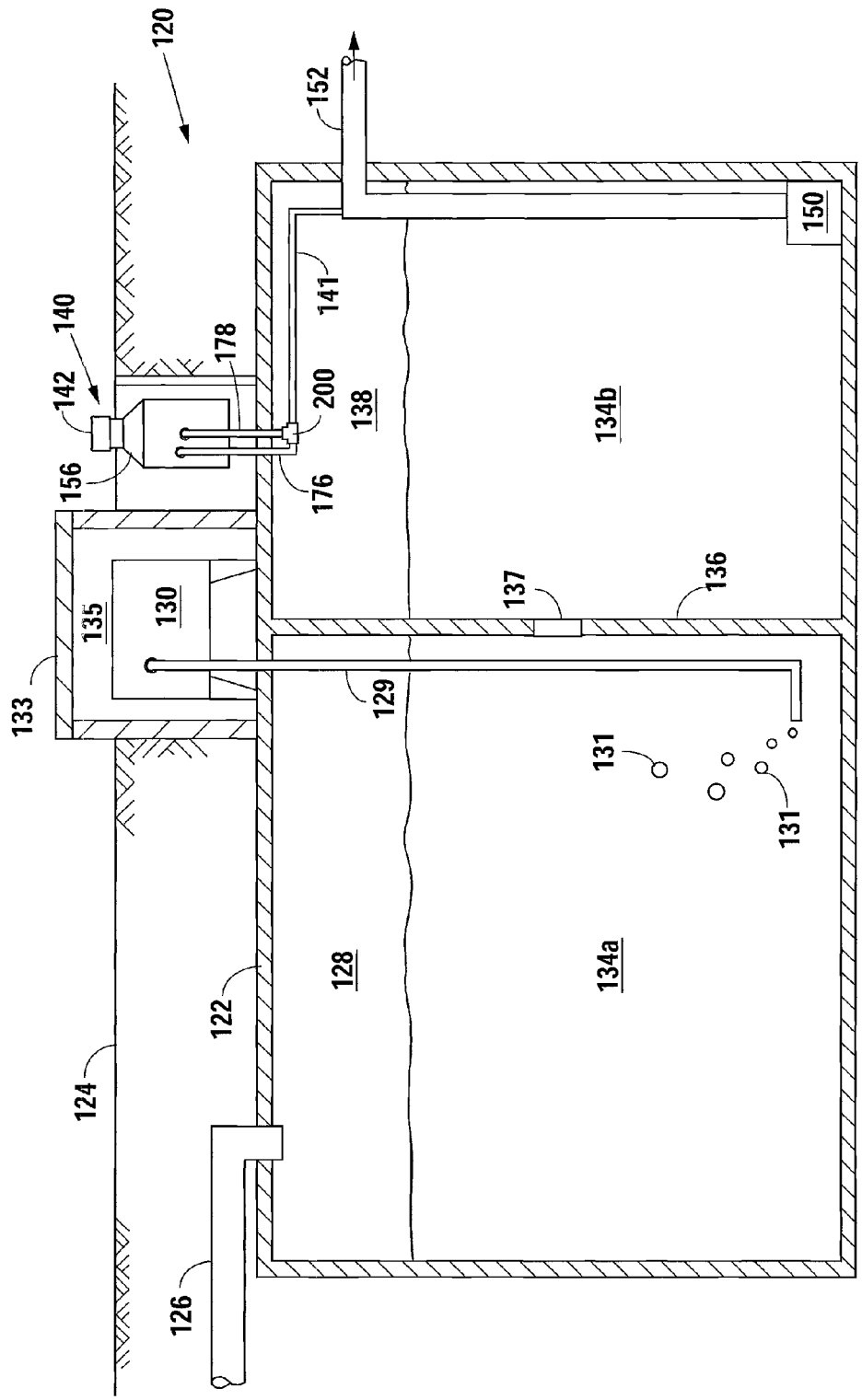
FIG. 3 discloses a partial sectional view of an aerobic treatment system incorporating an alternative embodiment of the present invention.

FIG. 3 discloses an aerobic treatment system 120 comprising a storage tank 122 buried under a ground surface 124 incorporating an alternative embodiment of the present invention. During operation, sewage flows from an on-site facility, such as a residence, through a sewage pipe 126 into the storage tank 122 and, more specifically, into an aeration chamber 128. Because aerobic bacteria present in the tank 122 require oxygen to break down the sewage into simple compounds, an air compressor 130, which is contained within a compressor chamber 135 and accessible by removing a cover 133, continuously forces air 131 into the aeration chamber 128 through an aeration hose 129. The sewage breakdown from this aerobic process produces primarily liquid wastewater 134a, 134b that flows from the aeration chamber 128 through an opening 137 in a baffle 136 and into a holding chamber 138. After proper dosing with disinfectant from a discharge assembly 200, a pump 150 moves the effluent through a discharge pipe 152 and into the surrounding environment.

The alternative embodiment of the pressure-actuated liquid disinfectant dispenser 140 is positioned in the earth near the storage tank 122 and is accessible from the surface 124. The dispenser 140 may be filled with disinfectant by removing a threaded cap 142 and pouring liquid disinfectant into the dispenser 140. A pressure line 176, which communicates effluent from an effluent supply line 141 into a reservoir 156 as described hereinafter, and a discharge tube 178, which communicates disinfectant to the holding chamber 138 as described hereinafter, protrude from the reservoir 156 of the dispenser 140 and are connected to the discharge assembly 200 positioned within the holding chamber 138. The dispenser 140 is preferably positioned near the tank 122 so that maintenance of the system 120 and the dispenser 140 can be near contemporaneous.

Figure 4:
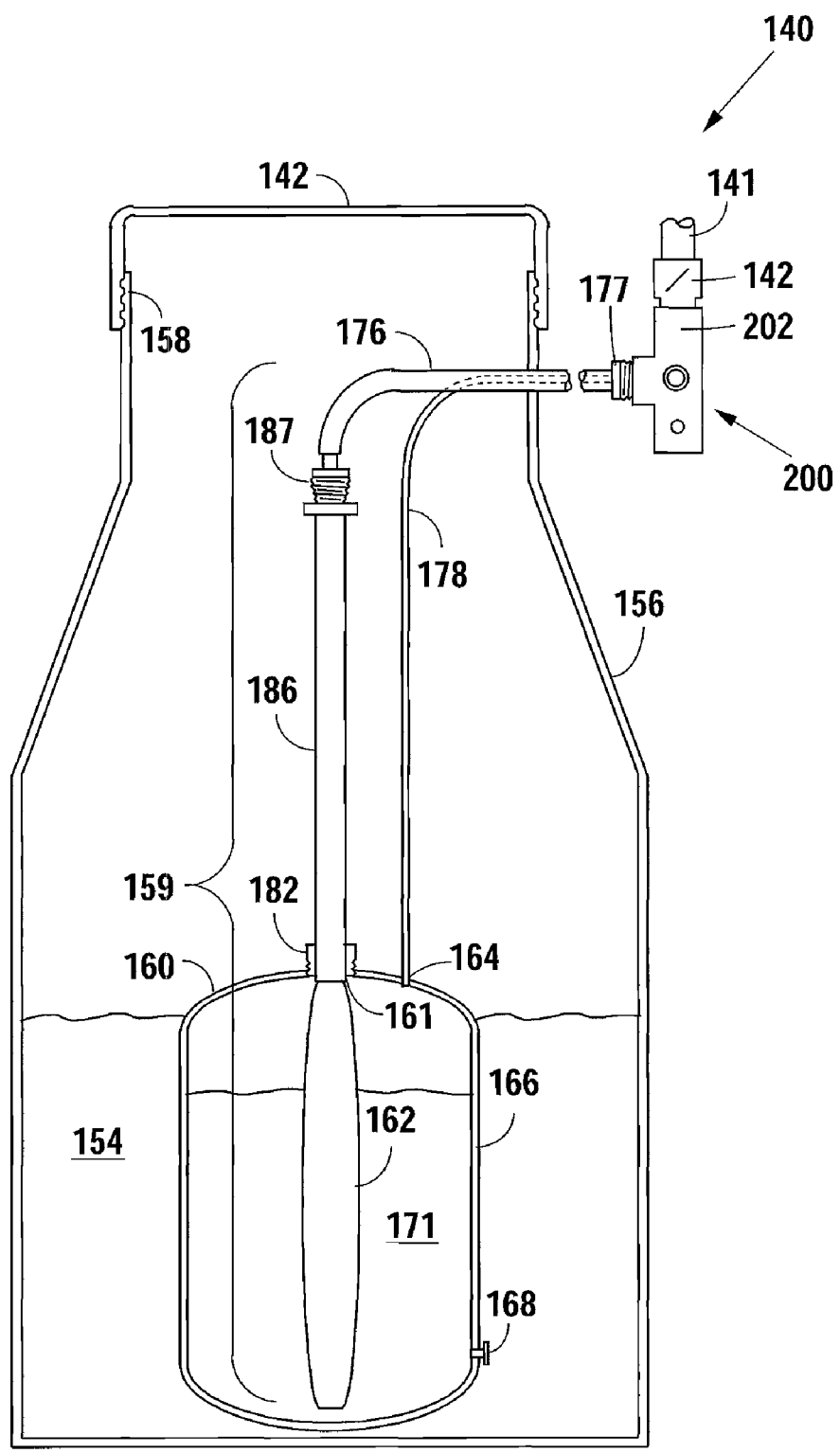
FIG. 4 illustrates a partial sectional view of the alternative embodiment.

FIG. 4 is a sectional view of the dispenser 140 in which pressure is directed into actuation means 159 comprising an expandable bladder 162 and a pressure line 176. The pressure causes a bladder 162 to inflate, the expansion of which causes disinfectant to be dispensed. A supply 154 of liquid disinfectant is contained by the reservoir 156 that is preferably PVC. The top end 158 of the reservoir 156 has outer threads. The cap 142, which is also preferably PVC, has inner threads matable to the outer threads at the top end 158 of the reservoir 156 so that it may be closed off from the environment and disinfectant held therein. The interior of the reservoir 156 may be accessed to add or remove disinfectant by removing the threaded cap 142.

A dosage container 160, or "bulb," is disposed within the interior of the reservoir 156. The closed, cylindrical container 160, which is also preferably PVC, has a first opening 161 with inner threads, a second opening 164, and a sidewall 166. A check valve 168 disposed in the sidewall 166 of the container 160 only allows disinfectant to flow in one direction: from the reservoir 156 into the container 160.

The expandable bladder 162 is disposed within the container 160 such that, when expanded, the volume of the interior of the container 160 is reduced. The bladder 162 is connected to a housing 186 that protrudes into and is mated through the male adapter 182 to the first opening 162 of the container 160. A barb fitting 187 is threadedly mated to the housing 186 to receive a pressure line 176 that communicates effluent from the discharge assembly 200 into the bladder 162 through the housing 186. A rubber discharge tube 178 provides a path for fluid communication between the interior of the container 160 and the discharge assembly 200, from which disinfectant is discharged into the wastewater 134b within the holding chamber 138 (see FIG. 4). The effluent supply line 141 is connected to the discharge assembly 200 through a ball valve 142.

Figure 5A:
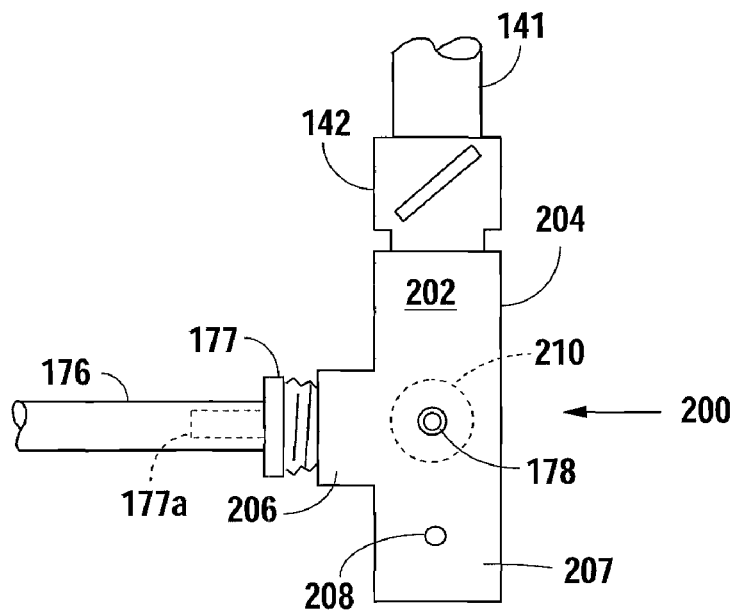
FIGS. 5A and 5B together show the discharge assembly of the alternative embodiment of the present invention.
Figure 5B:
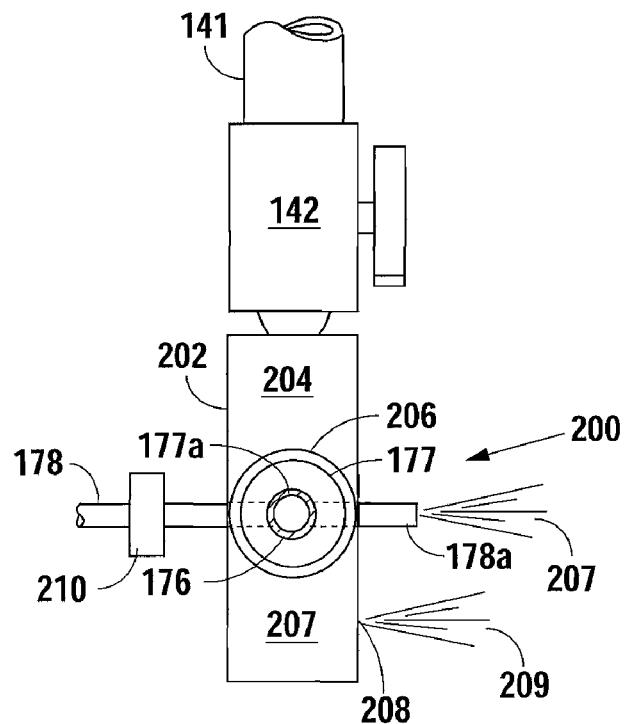

FIGS. 5A and 5B more clearly disclose the discharge assembly 200, which includes a tee fitting 202 having a first stem 204, second stem 206, and third stem 207. The first stem 204 and second stem 206 are open and matable to the effluent supply line 141 through the ball valve 142 and pressure line 176 through a barb fitting 177, respectively. The third stem 207 of the tee fitting 202 is closed to prevent effluent flow therethrough, except through a spray hole 208 disposed through the side of the fitting 202. The barb fitting 177 has external threads matable to the second stem 206 to receive the pressure line 176, which may be affixed thereto by sliding the pressure line 176 over the barb 177a and optionally securing the line to the fitting 177 with a hose clamp. The discharge tube 178 protrudes through the tee fitting 202 and is situated so that the opening 178a of the discharge tube 178 is positioned over the effluent spray hole 208.

When the pump 150 (see FIG. 3) activates to discharge effluent into the environment through the discharge pipe 152, effluent is also communicated into the discharge assembly 200 through the effluent supply line 141. Once in the tee fitting 202, a portion of the effluent will travel through the pressure line 176 and into the expandable bladder 162, while a portion of the effluent also exits the tee fitting 202 through the spray hole 208. As the fluid pressure within the bladder 162 increases, the bladder 162 expands to decreases the inner volume 170 of the container 160. This forces the dosage 171 of disinfectant 207 to exit the container 160 at the second opening 164 and move into the connected discharge tube 178 as no fluid can exit the container 160 through the check valve 168. After passing through the check valve 210, the disinfectant 207 is dispersed through an opening 178a of the discharge tube 178, which is located directly over the effluent spray hole 208 to facilitate mixing with the effluent 209. Because the third stem 207 is closed except for the spray hole 208, effluent 209 will be dispensed through the spray hole 208 as effluent moves into the discharge assembly 200 through the effluent supply line 141 during a pumping cycle.

When the pump 150 (see FIG. 3) deactivates, effluent is no longer forced into the discharge assembly 200 from the effluent supply line 141. Residual effluent contained within the discharge assembly 200 and connected components will tend to exit through the effluent spray hole 208, although residual effluent will remain within the pressure line 176 and bladder 162. Because effluent is no longer supplied to the discharge assembly 200 after the pump 150 is deactivated, the pressure within the bladder 162 will decrease, causing the bladder 162 to contract under the greater pressure of the disinfectant filling the container 160, and thus the inner volume 170 of the container to increase. Disinfectant will flow from the reservoir 156 through the check valve 168 to refill the container 160 in preparation for another effluent dosage cycle.

The present invention is described above in terms of a preferred illustrative embodiment of a specifically described liquid disinfectant dispenser and method, as well as an alternative embodiment of the present invention. Those skilled in the art will recognize that alternative constructions of such a dispenser can be used in carrying out the present invention. Other aspects, features, and advantages of the present invention may be obtained from a study of this disclosure and the drawings, along with the appended claims.

I claim:

1. A pressure-actuated liquid disinfectant dispenser for treating wastewater in an aerobic treatment system having a storage tank, said dispenser comprising:
    a reservoir adapted to hold a supply of disinfectant;
    a dosage container disposed within said reservoir and having a flow regulator disposed through a wall thereof, said flow regulator providing a fluid communication path adapted to control the flow of disinfectant from said reservoir to the interior of said dosage container;
    actuation means for increasing the pressure within said dosage container
    a discharge assembly connected to said dosage container and having a discharge end; and
    wherein said discharge assembly further comprises:
        a dispenser tube having an inlet end adjustably positionable within said dosage container and a discharge opening;
        a dispenser line connected to said discharge opening of said dispenser tube and having a discharge end opening disposed within said storage tank;
        a housing surrounding at least a portion of said dispenser tube and affixed to said dosage container;
        an adjustment nut threadable to an end of said housing; and
        an o-ring compressible between said adjustment nut and said dispenser tube.

2. The dispenser of claim 1 wherein said actuation means comprises:
    a source of compressed air; and
    a flow control valve having an inlet in communication with said source of compressed air and an outlet in communication with the interior of said dosage container.

3. The dispenser of claim 1 wherein said flow regulator is an emitter.

4. The dispenser of claim 2 wherein said valve is programmable to open at a predetermined time and for a predetermined interval.

5. The dispenser of claim 1 wherein said dispenser tube is rigid.

6. The dispenser of claim 1 wherein said line is flexible.

7. The dispenser of claim 4 wherein said flow control valve is a timer-controlled normally-closed valve.

8. A wastewater treatment system comprising:
    a storage tank adapted to receive and hold wastewater and having an aeration chamber and a holding chamber;
    an air compressor in communication with said aeration chamber;
    a liquid disinfectant dispenser in communication with said air compressor, said liquid disinfectant dispenser comprising:
        a reservoir adapted to hold a supply of disinfectant;
        a dosage container disposed within said reservoir and having a flow regulator disposed through a wall thereof, said flow regulator providing a fluid communication path adapted to control the flow of disinfectant from said reservoir to the interior of said dosage container;
        a flow control valve having an inlet in communication with said source of compressed air and an outlet in communication with the interior of said dosage container; and
        a discharge assembly connected to said dosage container and having a discharge end positioned within said storage tank; and wherein said discharge assembly further comprises:
            a dispenser tube having an inlet end adjustably positionable within said dosage container and a discharge opening;
            a dispenser line connected to said discharge opening of said dispenser tube and having a discharge end opening disposed within said storage tank;
            a housing surrounding at least a portion of said dispenser tube and affixed to said dosage container;
            an adjustment nut threadable to an end of said housing; and
            an o-ring compressible between said adjustment nut and said dispenser tube.

9. The system of claim 8 wherein said flow regulator is an emitter.

10. The system of claim 8 wherein said dispenser tube is rigid.

11. The system of claim 8 wherein said dispenser line is flexible.

12. The system of claim 8 wherein said flow control valve is a timer-controlled normally-closed valve.

* * * * *